(No Model.)

H. SCHNEIDER.
SHAFT COUPLING.

No. 435,325. Patented Aug. 26, 1890.

WITNESSES:
F. L. Durand
H. L. Coombs

INVENTOR:
Hippolyte Schneider
Evans Bagger & Co,
Attorneys

UNITED STATES PATENT OFFICE.

HIPPOLYTE SCHNEIDER, OF PITTSBURG, PENNSYLVANIA, ASSIGNOR OF ONE-HALF TO CHARLES HUFF, OF SAME PLACE.

SHAFT-COUPLING.

SPECIFICATION forming part of Letters Patent No. 435,325, dated August 26, 1890.

Application filed May 26, 1890. Serial No. 353,224. (No model.)

*To all whom it may concern:*

Be it known that I, HIPPOLYTE SCHNEIDER, a citizen of the United States, and a resident of Pittsburg, in the county of Allegheny and State of Pennsylvania, have invented certain new and useful Improvements in Shaft-Couplings; and I do hereby declare that the following is a full, clear, and exact description of the invention, which will enable others skilled in the art to which it appertains to make and use the same, reference being had to the accompanying drawings, which form a part of this specification.

My invention relates to improvements in shaft-couplings, or devices for connecting the ends of shafts, whereby in effect a continuous shaft is produced.

I am aware that many contrivances have been devised for connecting the ends of shafts, but they are more or less unsuccessful owing to inherent defects in construction and mode of operation.

The object of my invention is to provide a simple, economical, and effective device for the above-named purpose, in which the shafts can be readily connected and disconnected, and which will make a rigid joint at the point of connection, whereby the connected shafts will be just as effective as if made continuous or integral with each other.

The invention consists in the novel construction and combination of parts hereinafter fully described, and definitely pointed out in the claims.

Figure 1:
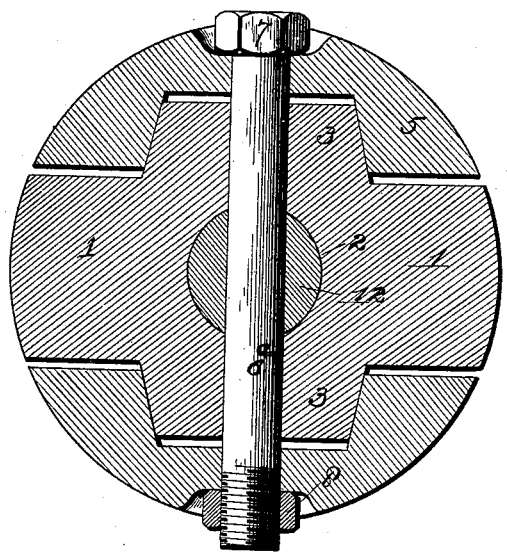
Figure 2:
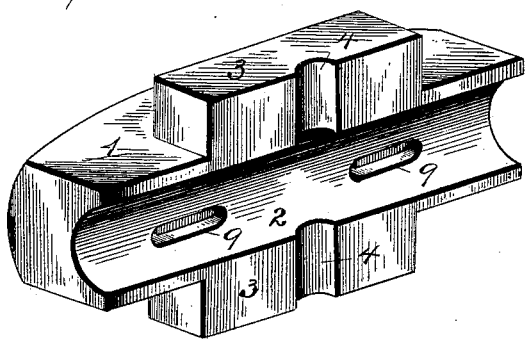
Figure 4:
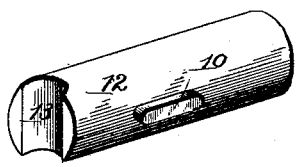
Figure 3:
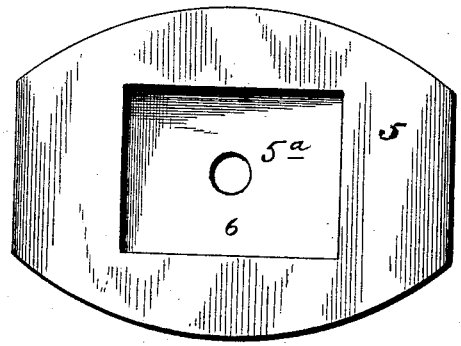

In the accompanying drawings, Figure 1 is a central sectional view of a coupling and shafts connected in accordance with my invention. Fig. 2 is a perspective view of one of the boxes which receives the ends of the shafts. Fig. 3 is an inside view of one of the binding-plates. Fig. 4 is a detail view of the end of one of the shafts.

In the said drawings, the reference-numeral 1 designates two boxes, each having a central longitudinal groove 2 on its inner side. These boxes are exact duplicates of each other, and when placed together, as shown in Fig. 1, a circular or annular bore is formed to receive the ends of the shafts to be coupled. At the center of each of these boxes is provided or formed two outwardly-projecting wings 3, having transverse grooves 4, to receive a securing pin or bolt.

The numeral 5 designates binding-plates having square or rectangular recesses or depressions 6 in their inner faces to receive the wings 3, and in their centers are formed openings 5ª for the passage of the securing-bolt. This bolt 6ª is formed with a head 7, and is screw-threaded at its other end to receive a binding-nut 8. In the grooves in one of said wings 3 are formed the slots 9 to receive lugs 10 on the shafts 12, and said shafts at their meeting ends are also formed with grooves 13.

The operation is as follows: The meeting ends of the shafts are brought together, so that the grooves therein register with each other and form an annular recess or opening. One of the boxes is then applied with the lugs 10 of the shafts fitting in the slots 9. The other box is then placed in position and the binding-plates fitted thereto with the wings 3 engaging in the depressions or recesses 6. When in this position, a central passage or opening is formed for the securing-bolt, which is inserted therein and held in place by the binding-nut.

From the above it will be seen that a very secure and rigid joint or connection is formed, whereby all the advantages of a continuous shaft are secured.

Having thus described my invention, what I claim is—

1. A shaft-coupling consisting of the boxes having longitudinal grooves therein and rectangular wings provided with transverse grooves, the binding-plates having rectangular recesses or depressions for receiving the wings and central apertures, and securing-bolts passing through said apertures, substantially as described.

2. A shaft-coupling consisting of the boxes having longitudinal grooves therein and slots for the reception of lugs on the shafts, wings provided with transverse grooves, and binding-plates having central apertures and depressions or recesses to receive the wings, and a securing-bolt, substantially as described.

3. In a shaft-coupling, the combination, with the shafts having registering grooves at their meeting ends and lugs to engage with grooves in the boxes, of the boxes having longitudinal grooves with slots to receive said lugs and provided or formed with wings having transverse grooves, the binding-plates having depressions or recesses to receive the wings and provided with central openings or apertures, and the securing-bolt passing through said boxes and plates, substantially as described.

In testimony that I claim the foregoing as my own I have hereunto affixed my signature in presence of two witnesses.

HIPPOLYTE SCHNEIDER.

Witnesses:
    WM. HENNING,
    HERMAN SOOG.